(12) United States Patent
Li

(10) Patent No.: US 11,009,054 B2
(45) Date of Patent: May 18, 2021

(54) FIXING DEVICE, DISPLAY MODULE AND DISPLAY DEVICE

(71) Applicant: BOE TECHNOLOGY GROUP CO., LTD., Beijing (CN)

(72) Inventor: Jing Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 549 days.

(21) Appl. No.: 15/937,013

(22) Filed: Mar. 27, 2018

(65) Prior Publication Data
US 2019/0120266 A1 Apr. 25, 2019

(30) Foreign Application Priority Data
Oct. 23, 2017 (CN) .......................... 201711057001.X

(51) Int. Cl.
*G06F 1/16* (2006.01)
*G02F 1/1333* (2006.01)
*F16B 5/02* (2006.01)
*H05K 5/00* (2006.01)

(52) U.S. Cl.
CPC ...... *F16B 5/0208* (2013.01); *G02F 1/133308* (2013.01); *G06F 1/1601* (2013.01); *H05K 5/0017* (2013.01); *G02F 2201/46* (2013.01)

(58) Field of Classification Search
CPC .. G02B 6/0081; G02B 6/0065; G02B 6/0086; G02F 1/133308; G02F 2001/133314; G02F 1/133608; G02F 2201/46; G02F 1/1333; G02F 1/0107
USPC .................................................. 362/632–634
See application file for complete search history.

(56) References Cited

U.S. PATENT DOCUMENTS

| 8,757,861 | B2 | 6/2014 | Kim | |
|---|---|---|---|---|
| 2011/0157844 | A1* | 6/2011 | Chan | G02F 1/133308 361/749 |
| 2012/0081631 | A1* | 4/2012 | He | G02F 1/133308 349/61 |

(Continued)

FOREIGN PATENT DOCUMENTS

| CN | 2916222 Y | 6/2007 |
|---|---|---|
| CN | 202690643 U | 1/2013 |

(Continued)

OTHER PUBLICATIONS

Office Action dated Mar. 23, 2020 issued in corresponding Chinese Application No. 201711057001.X.

(Continued)

*Primary Examiner* — William J Carter
(74) *Attorney, Agent, or Firm* — Nath, Goldberg & Meyer; Joshua B. Goldberg

(57) ABSTRACT

The present disclosure provides a fixing device, a display module, and a display device. The fixing device includes a frame and a fixture for fixing a display module, a protrusion is provided at a side edge of the frame, and a through-hole is provided in the protrusion, the fixture is detachably connected with the through-hole, and the fixture has a connecting hole along an axial direction of the fixture, the connecting hole is used for detachably connecting with a connecting member. The fixing device provided in the present disclosure can not only satisfy the appearance effect of a narrow frame, but also can achieve the fixing of the display module during assembly.

11 Claims, 3 Drawing Sheets

(56) References Cited

U.S. PATENT DOCUMENTS

2014/0091532 A1    4/2014  Unger et al.

FOREIGN PATENT DOCUMENTS

| CN | 103226917 A   | 7/2013 |
| CN | 103711754 A   | 4/2014 |
| CN | 206385658 U   | 8/2017 |
| CN | 206505683 U   | 9/2017 |
| KR | 10-0319202 B1 | 7/2000 |

OTHER PUBLICATIONS

Office Action dated Mar. 21, 2019 issued in corresponding Chinese Application No. 201711057001.X.

* cited by examiner

A-A

FIXING DEVICE, DISPLAY MODULE AND DISPLAY DEVICE

CROSS-REFERENCE TO RELATED APPLICATION

This application claims the priority of China Patent Application No. 201711057001.X, filed in China on Oct. 23, 2017, the entire contents of which are hereby incorporated by reference.

TECHNICAL FIELD

The present disclosure relates to the field of display technologies, and in particular, relates to a fixing device, a display module, and a display device.

BACKGROUND

In general, it is necessary to assemble a display module in a display and fix it with a fixing device. In design of the fixing device, it is usually required to design four connecting holes on the side of the display module for fixing the display module by threaded connection with a fixture during assembly.

SUMMARY

The present disclosure provides a fixing device, a display module and a display device, which can not only satisfy the appearance effect of a narrow frame, but also realize the fixation of the display module during assembly.

To solve the above technical problems, present disclosure provides a fixing device including a frame and a fixture for fixing a display module, a protrusion is provided at a side edge of the frame, and a through-hole is provided in the protrusion; and the fixture is detachably connected with the through-hole, and the fixture has a connecting hole along an axial direction of the fixture; the connecting hole is used for detachably connecting with a connecting member.

Optionally, the fixture includes a first portion, a second portion, and a connecting portion, the connecting portion is disposed between the first portion and the second portion, and an outer diameter of the connecting portion is formed smaller than each of the outer diameters of the first portion and the second portion; and, at least one of the first portion and the second portion is an elastomer.

Optionally, the outer diameter of the elastomer is gradually decreased toward a direction away from the connecting portion; and both of maximum outer diameters of the first portion and the second portion are greater than the diameter of the through-hole.

Optionally, one of the first portion and the second portion is an elastomer, and the other is a non-elastomer, wherein a shape of a cross-section, being perpendicular to an axial direction of the connecting hole, of the non-elastomer one among the first portion and the second portion is selected from a group consisting of a circle, a triangle, a square, and a hexagon.

Optionally, a material used for the elastomer includes silica gel or rubber.

Optionally, a direction in which a protruding direction of the protrusion protruding toward a non-display side of the display module is perpendicular to a display surface of the display module; and the axial direction of the through-hole and the display surface of the display module are parallel to each other.

Optionally, the connecting hole penetrates through the fixture, and an axial direction of the connecting hole and the axial direction of the through-hole are parallel to each other.

Optionally, the protrusions are provided on at least one pair of side surfaces of the frame facing each other; the protrusions on each of the side surfaces is one or more, and when there are a plurality of the protrusions on each of the side surfaces, the protrusions on each of the side surfaces are arranged at intervals, and a number of the fixtures is the same as that of the protrusions, and the fixtures and protrusions are provided to one-to-one correspondence.

The present disclosure further provides a display module, which includes a fixed device as described above.

The present disclosure further provides a display device, which includes a display module as described above.

DETAILED DESCRIPTION OF THE EMBODIMENTS

Figure 1:
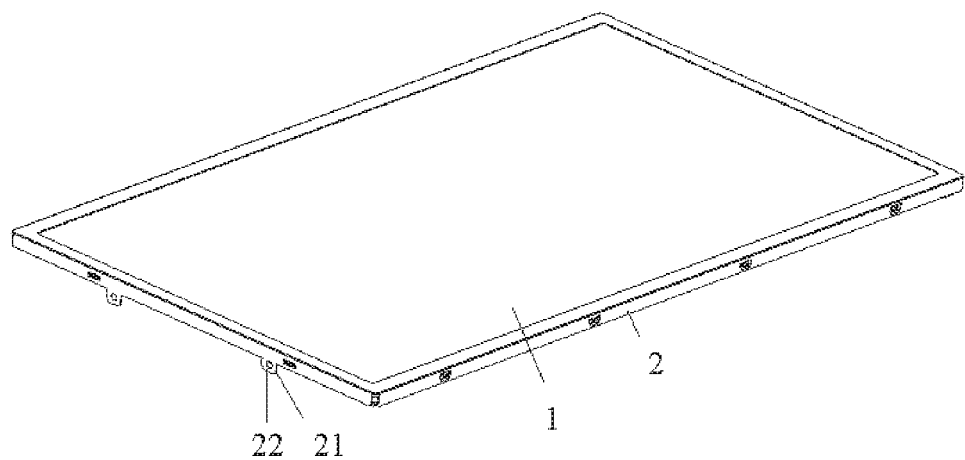
FIG. 1 is a side view of a fixing device according to an embodiment of the present disclosure.
Figure 2:
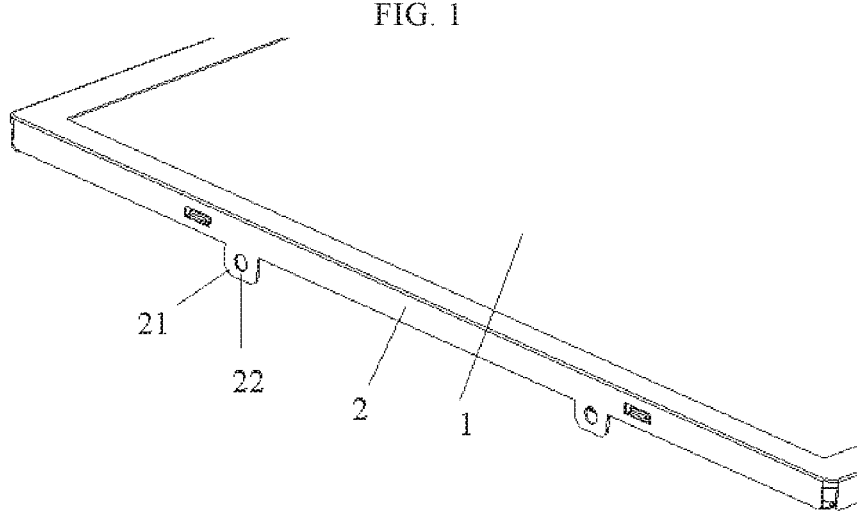
FIG. 2 is a partially enlarged view of a fixing device according to an embodiment of the present disclosure.

In order to make those skilled in the art better understand the technical solutions of the present disclosure, the following will describe a fixing device, a display module, and a display device provided in the present disclosure in detail with reference to the accompanying drawings.

Referring to FIG. 1 to FIG. 4, a fixing device provided in an embodiment of the present disclosure includes a frame 2 and a fixture 3 for fixing a display module 1. Side edges of the frame 2 are provided with protrusions 21, and a through-hole 22 is provided in the protrusions 21. The fixture 3 is detachably connected with the through-hole 22, and the fixture 3 has a connecting hole 34 in the axial direction of the fixture 3 for connecting with a detachable connecting member. The axial direction of the fixture 3 and the axial direction of the through-hole 22 are parallel to each other.

Figure 3C:
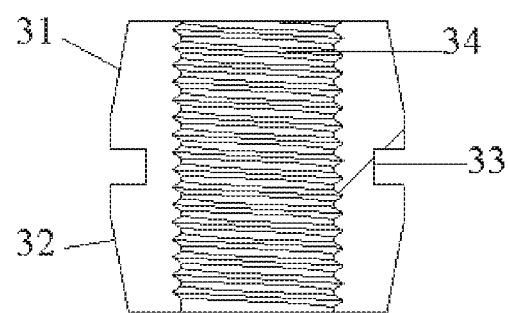
FIG. 3C is a sectional view taken along line A-A of FIG. 3B.
Figure 4:
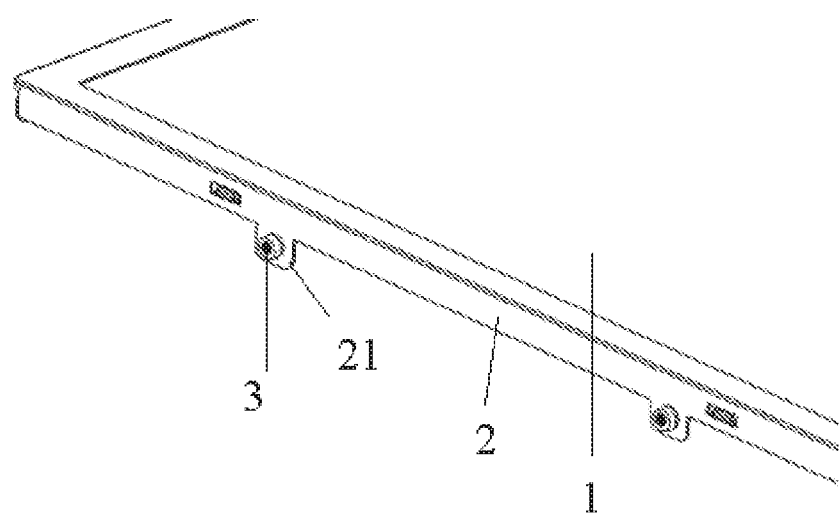
FIG. 4 is an assembly drawing of a fixture used in an embodiment of the present disclosure.

When the display module 1 needs to be fixed, the fixture 3 and the through-hole 22 are detachably connected. As shown in FIG. 3C and FIG. 4, since the fixture 3 has the connecting hole 34, a connecting member (not shown) is detachably connected with the connecting hole 34, i.e. the connecting member and the connecting hole 34 are fixed, so that the display module 1 can be fixed.

For example, the connecting hole 34 may be a threaded hole, which may be screw-connected with a detachable connecting member (such as a bolt) having an external thread, that is, the detachable connecting member and the connecting hole 34 are fixed so that the display module 1 can be fixed. Optionally, the above-mentioned threaded hole conforms to a standard thread, so as to be able to adapt to various standard parts. Definitely, the connecting hole 34 may also be connected with the detachable connecting member by other connection means in practical applications, such as a snap connection. In addition, the shape of the connecting hole 34 should match the shape of the detachable connecting member.

In addition, the fixture 3 can be detached from the through-hole 22 when it is not required to be fixed.

In addition, since the protrusions 21 protrudes from the side edges of the frame 2, the fixture 3 installed in the through-hole 22 is located at outside the display module 1, so as to not occupy the space of the internal backlight. Thus, the appearance of a narrow frame can be satisfied, and the display module can be fixed during assembly at the same time.

In practical applications, the protruding direction of the protrusions 21 protruding toward the non-display side of the display module 1 is perpendicular to a display surface of the display module 1, and the axial direction of the through-hole 22 and the display surface of the display module 1 are parallel to each other, so as to facilitate the installation of the fixture 3.

The configuration of the fixture 3 will be described in detail below. Specifically, referring to FIG. 3A to FIG. 3C, the fixture 3 includes a first portion 31, a second portion 32, and a connecting portion 33. The connecting portion 33 is formed between the first portion 31 and the second portion 32, and both the outer diameters of the first portion 31 and the second portion 32 are larger than the outer diameter of the connecting portion 33, so that an annular groove structure is formed by the connecting portion 33 between the first portion 31 and the second portion 32.

In addition, the first portion 31 may be an elastomer. In this case, the first portion 31 can be deformed by compression to pass through the through-hole 22, so that the fixture 3 is fixed on the protrusion 21 by the connecting portion 33. In addition, the second portion 32 and/or the connecting portion 33 may also be an elastomer. In other words, at least one of the first portion 31 and the second portion 32 is an elastomer, so as to facilitate to assemble the fixture 3 on the connecting portion 33.

In practical applications, the shapes of the first portion 31 and the second portion 32 described above may be the same (for example, they may be symmetrical to each other with respect to the connecting portion 33), or they may have different shapes. Moreover, the first portion 31, the connecting portion 33, and the second portion 32 may be a one-piece structure or may also be a split-type structure. For example, the first portion 31 and the second portion 32 are both ringed bodies and are sleeved on the connecting portion 33. The ends of the first portion 31 and the second portion 32 are respectively aligned with the two ends of the connecting portion 33. For another example, the first portion 31, the connecting portion 33, and the second portion 32 are connected or integrated in sequence along the axial direction of the through-hole 22.

Optionally, one of the first portion 31 and the second portion 32 of the fixture 3 is an elastomer, and the other is a non-elastomer. The shape of a cross-section, being perpendicular to the axial direction of the connecting hole 34, of the non-elastomer one among the first portion 31 and the second portion 32 may be selected from a group consisting of a circle, a triangle, a square, and a hexagon, and the like, so as to conform to the shape of a corresponding fastening tool, so that the fixture 3 obtains a better fastening effect.

Optionally, the material used for the above elastomer includes a material with a better elasticity, such as silica gel or rubber.

Figure 3A:
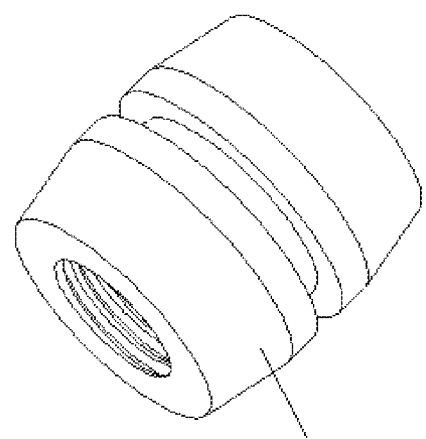
FIG. 3A is a perspective view of a fixture used in an embodiment of the present disclosure.
Figure 3B:
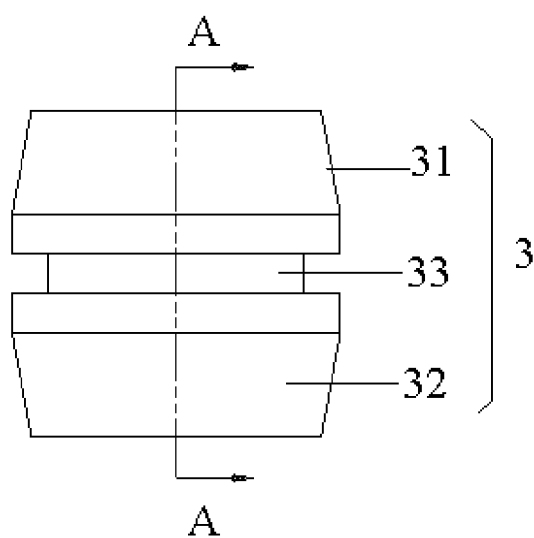
FIG. 3B is a front view of a fixture used in an embodiment of the present disclosure.

Optionally, as shown in FIG. 3B, the outer diameter of the first portion 31 is gradually decreased toward a direction away from the connecting portion 33, which may allow the first portion 31 to have a slope. The presence of the slope may make it more easily to insert the first portion 31 as an elastomer into the through-hole 22. Also, both the maximum outer diameters of the first portion 31 and the second portion 32 are greater than the diameter of the through-hole 22. In this case, the connecting portion 33 can be fixed to the protrusions 21.

If both the first portion 31 and the second portion 32 are elastomer, the outer diameter of the first portion 31 shown in FIG. 3B may be gradually decreased from the bottom to the top; the outer diameter of the second portion 32 shown in FIG. 3B may be gradually decreased from the top to the bottom. In this way, both the first portion 31 and the second portion 32 may be inclined so that any one of the first portion 31 and the second portion 32 can be inserted into the through-hole 22.

Definitely, it is also possible to make only the second portion 32 as an elastomer. The outer diameter of the second portion 32 is gradually decreased toward a direction away from the connecting portion 33, which may allow the second portion 32 to have a slope. The presence of the slope may make the second portion 32 as an elastomer insert into the through-hole 22 more easily. Also, both the maximum outer diameters of the first portion 31 and the second portion 32 are greater than the diameter of the through-hole 22. In this case, the connecting portion 33 can be fixed to the protrusions 21.

In other words, at least one of the first portion 31 and the second portion 32 is an elastomer. The outer diameter of the first portion 31 and/or the second portion 32 as the elastomer may be gradually decreased toward a direction away from the connecting portion 33. Both the maximum outer diameters of the first portion 31 and the second portion 32 are greater than the diameter of the through-hole 22.

Optionally, the connecting hole 34 penetrates the fixture 3 along the axial direction of the fixture 3. In this way, the detachable connection member can be passed through the fixture 3, so that the length of the fitting can be increased. Thus, the fixation to the display module 1 can be more stable. In addition, by making the axial direction of the connecting hole 34 and the axial direction of the through-hole 22 parallel to each other, the display module 1 can be fixed while make the display surface of the display module 1 horizontal to facilitate assembly. In practical applications, in the premise that the fitting length of the detachable connection member and the connecting hole 34 satisfies the requirement, the connecting hole 34 may be provided only in the first portion 31 or the second portion 32, or provided in the first portion 31 and the connecting portion 33, or provided in the second portion 32 and the connecting portion 33.

In practical applications, the above-mentioned protrusions 21 are provided on at least one pair of side surfaces of the frame 2 facing each other. That is, the protrusions 21 may be provided on two of the four side surfaces facing each other, or the protrusions 21 may be provided on all four side surfaces. Further, with respect to each side surface having the protrusion 21, the protrusion 21 thereon may be one or more. When there are a plurality of protrusions 21 on each of the side surfaces, the protrusions 21 on each of the side surfaces may be arranged at intervals so that the side surface of the frame 2 where the protrusion 21 is located can be more stably fixed. The number of the fixtures 3 is the same as the number of the protrusions 21, and the fixtures 3 and protrusions 21 are provided to one-to-one correspondence.

Accordingly, the fixing device provided in the embodiment of the present disclosure can not only satisfy the appearance effect of a narrow frame, but also can achieve the fixation of the display module during assembly.

As another technical solution, an embodiment of the present disclosure further provides a display module including the above-mentioned fixing device provided in the embodiment of the present disclosure.

In the display module provided in the embodiment of the present disclosure, by using the above-mentioned fixing device provided in the embodiment of the present disclosure, both the appearance effect of the narrow frame and the fixation of the display module can be achieved during assembly.

As another technical solution, an embodiment of the present disclosure further provides a display device including the above display module provided in the embodiment of the present disclosure.

The display device provided in the embodiment of the present disclosure adopts the above-mentioned display module provided in the embodiment of the present disclosure. Therefore, the display device can not only satisfy the appearance effect of the narrow frame but also can achieve the fixation of the display module during assembly.

It can be understood that the above embodiments are merely exemplary embodiments used for illustrating the principle of the present disclosure, but the disclosure is not limited thereto. For a skilled person, various modifications and improvements may be made without departing from the spirit and essence of the present disclosure, and these variations and improvements are also considered as the protection scope of the present disclosure.

The invention claimed is:

1. A fixing device, including a frame and a fixture for fixing a display module, wherein
   a protrusion is provided at a side edge of the frame, and a through-hole is provided in the protrusion;
   the fixture is detachably connected with the through-hole, and the fixture has a connecting hole along an axial direction of the fixture; the connecting hole is used for detachably connecting with a connecting member,
   wherein the fixture includes a first portion, a second portion, and a connecting portion, the connecting portion is disposed between the first portion and the second portion, and an outer diameter of the connecting portion is formed smaller than each of outer diameters of the first portion and the second portion;
   at least one of the first portion and the second portion is an elastomer; and
   the elastomer of the at least one of the first portion and the second portion is deformed by compression to pass through the through-hole, so that the fixture is fixed on the protrusion by the connecting portion.

2. The fixing device according to claim 1, wherein the outer diameter of the elastomer is gradually decreased toward a direction away from the connecting portion; and maximum outer diameters of the first portion and the second portion are greater than the diameter of the through-hole.

3. A display module, which includes a fixed device according to claim 2.

4. A display device, which includes a display module according to claim 3.

5. The fixing device according to claim 1, wherein one of the first portion and the second portion is an elastomer, and the other is a non-elastomer, wherein a shape of a cross-section, being perpendicular to an axial direction of the connecting hole, of the non-elastomer one among the first portion and the second portion is selected from a group consisting of a circle, a triangle, a square, and a hexagon.

6. The fixing device according to claim 1, wherein a material used for the elastomer includes silica gel or rubber.

7. The fixing device according to claim 1, wherein a protruding direction of the protrusion protruding toward a non-display side of the display module is perpendicular to a display surface of the display module; and
   the axial direction of the through-hole and the display surface of the display module are parallel to each other.

8. The fixing device according to claim 1, wherein the connecting hole penetrates through the fixture, and an axial direction of the connecting hole and the axial direction of the through-hole are parallel to each other.

9. The fixing device according to claim 1, wherein the protrusions are provided on at least one pair of side surfaces of the frame facing each other;
   the protrusions on each of the side surfaces is one or more, and when there are a plurality of the protrusions on each of the side surfaces, the protrusions on each of the side surfaces are arranged at intervals, and
   a number of the fixtures is the same as that of the protrusions, and the fixtures and protrusions are provided to one-to-one correspondence.

10. A display module, which includes a fixed device according to claim 1.

11. A display device, which includes a display module according to claim 10.

* * * * *